United States Patent [19]
Reitz et al.

[11] 3,799,709
[45] Mar. 26, 1974

[54] RADIAL SEAL FOR ROTARY ENGINE PISTONS

[75] Inventors: Johannes Reitz, Kirchhausen; Hans-Jurgen Frese, Bad Friedrichshall; Rainer Bedenbender, Fellerdilln; Josef Heim, Oedheim, all of Germany

[73] Assignee: Karl Schmidt GmbH, Neckarsulm, Germany

[22] Filed: June 8, 1972

[21] Appl. No.: 260,936

[30] Foreign Application Priority Data
June 8, 1971  Germany............................ 2128355

[52] U.S. Cl................ 418/91, 418/113, 418/179, 277/75
[51] Int. Cl. ... F01c 19/02, F01c 21/06, F04c 27/00
[58] Field of Search........ 418/83, 91, 113, 122–124, 418/179; 123/8.01; 277/74, 75

[56] References Cited
UNITED STATES PATENTS

| | | |
|---|---|---|
| 3,366,317 | 1/1968 | Keylwert.............................. 418/91 |
| 3,444,842 | 5/1969 | Bensinger et al. ..................... 418/91 |
| 3,263,657 | 8/1966 | Gassmann......................... 123/8.01 |
| 3,130,683 | 4/1964 | Paschke et al........................ 418/91 |
| 3,204,614 | 9/1965 | Huber................................. 418/91 |
| 3,206,108 | 9/1965 | Abermeth............................ 418/91 |
| 3,302,624 | 2/1967 | Tatsutomi............................ 418/91 |

FOREIGN PATENTS OR APPLICATIONS
941,029  11/1963  Great Britain..................... 123/8.01

*Primary Examiner*—Carlton R. Croyle
*Assistant Examiner*—John J. Vrablik
*Attorney, Agent, or Firm*—Burgess, Dinklage & Sprung

[57] ABSTRACT

A radial seal for rotary-piston, internal-combustion engines is disclosed. The piston is polygonal and concentrically mounted on an eccentric shaft for rotation with a sliding fit about an internal axis of rotation. The radial seal includes a sealing strip at each corner of the piston in piston grooves which are parallel to the piston axis. Sealing strip carriers at each corner of the piston extend radially and parallel to the piston axis are made of a material other than that of the piston. The carriers include tubes closed at both ends through which a cooling fluid is circulated. At the radially outer side of the tubes an extension forms the piston grooves. The tubes communicate with an annular chamber located at each face of the piston hub. The annular chambers are divided into a plurality of compartments in communication with each other. The compartments of one annular chamber are connected to the corresponding compartments in the other annular chamber by by-pass conduits.

9 Claims, 3 Drawing Figures

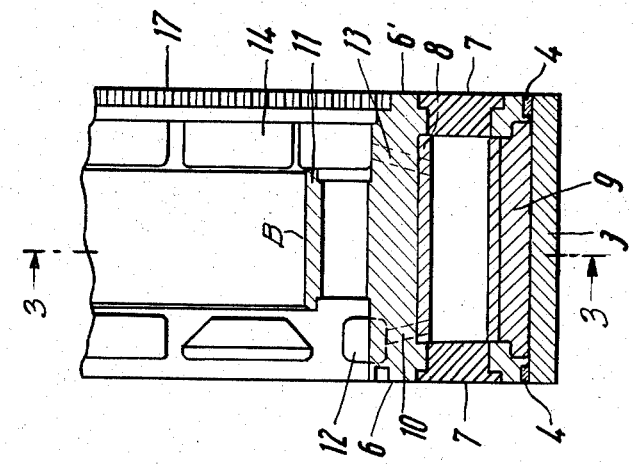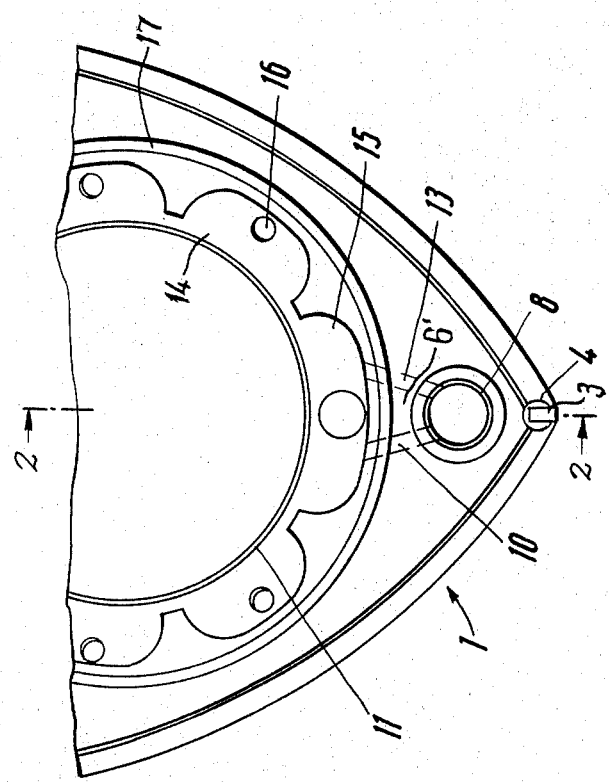

RADIAL SEAL FOR ROTARY ENGINE PISTONS

BACKGROUND

This invention relates to a radial seal for a piston for an internal-combustion rotary engine. The piston preferably is made of a light alloy. The polygonal piston is concentrically mounted on an eccentric shaft for rotation about an internal axis, preferably with a sliding fit. The seal includes a sealing strip inserted in a piston groove at each corner of the piston with a slight or small play. Each end of the strip fit in notches formed in sealing inserts in register with the piston groove.

In internal-combustion rotary engines, the sealing strip mounted at each corner of the piston seals against the inside peripheral surface and the end portions of the housing by a linear contact and under a high pressure per unit of area which is produced by the pressure of the combustion gases. As the piston revolves, the seal performs a pivotal movement. The sealing strip slides along the inside peripheral surface of the housing mainly with mixed friction. The frictional heat generated together with the heat transferred from the combustion gases to the sealing strip must be dissipated through the piston otherwise the comparatively high thermal load can result in deformation, change of bearing clearance, thermal distortion, impact wear of the piston grooves, and wear of the sealing strip because of its sequence of pivotal movements so that a satisfactory function of the rotary engine is no longer ensured. For this reason, the piston corners must be adequately cooled. Considerable difficulties are involved in rapidly dissipating the heat. To cope with these difficulties, rotary pistons have been made hollow with internal cavities for circulating a cooling liquid. To this end polygonal pistons of trochoidal rotary engines are provided with means for enforced cooling. The space for the cooling liquid is divided into compartments by a partition which extends in the axial direction of the piston at the center of the piston side between two corners of the piston. Each compartment is provided at one piston corner with a radial bore, through which the cooling liquid is supplied from the center of the piston. Bores for discharging the cooling liquid are provided near that partition which separates said compartment from the following one (DOS 1,145,430).

It is also known to cool the radial seals of pistons for rotary engines with the aid of axially extending coolant passages provided on both sides of the radial seals and annular passages formed in the piston. Coolant is supplied to and discharged from the coolant passage through a central coolant supply passage and through coolant discharge passages which are disposed at the end of the axially extending coolant passages and connected to the annular passages (DAS 1,251,580).

In another known piston for rotary engines, indirect cooling is carried out by corners designed to contain substances having a high thermal conductivity, such as sodium. For direct cooling of the piston with oil, the same is formed around its hub with an annular chamber, whose radially outer wall forms the piston side in the regions between the corners and which is divided by a partition that is transverse to the piston axis into two part-annular compartments, which are open or covered toward the end walls of the piston (DOS 1,189,783).

The prior cooling systems described above enable a reduction of the thermal load, particularly at the piston corners, but the cooling is not so intense as to accomplish an optimum heat supply from the region of the piston corners, particularly from the sealing strips.

For this reason, it is an object of the invention to provide for such cooling of the piston corners that an optimum dissipation of heat from these regions is ensured, particularly from the sealing strips, which are subjected to the highest thermal load.

SUMMARY

According to the invention, this object is accomplished by sealing strip carrier means made of a material other than that of the piston and extending radially and parallel to the piston axis adjacent each piston corner containing a sealing strip means. Each sealing strip carrier includes tube means closed at both ends, for example, by discs inserted into the faces of the piston, means to circulate a coolant therethrough, and on the radially outer side of the tube means, extension means forming the piston groove and adapted to rapidly transfer heat from the sealing strip means to the tube means.

The tube means is connected by an inlet passage to an annular chamber provided at one face of the piston hub and by an outlet passage to an annular chamber disposed at the other face of the piston hub. One annular chamber serves to circulate coolant to the tube means and the other serves to carry it away. The two annular chambers are positioned on the inside peripheral surface of the piston and are radially inwardly open and divided into a plurality of compartments in communication with one another. Except for the compartments adjacent the corners of the piston, the compartments of the annular chamber at one face of the piston hub are connected by respective by-pass conduits to the directly opposite compartments of the annular chamber disposed at the other piston face.

According to a preferred embodiment of the invention, the by-pass conduits are inclined from the annular coolant supply chamber to the annular coolant discharge chamber at an angle of 0°–30°, preferably 1°–20°, particularly 2°–10° toward the piston axis.

DESCRIPTION OF THE DRAWING

FIG. 1 is a top view in elevation partly broken away showing one face of the piston of the invention with discs 7 removed;

FIG. 2 is a vertical cross-sectional view taken along line 2—2 of FIG. 1 with discs 7 in place.

DESCRIPTION

Figure 3:
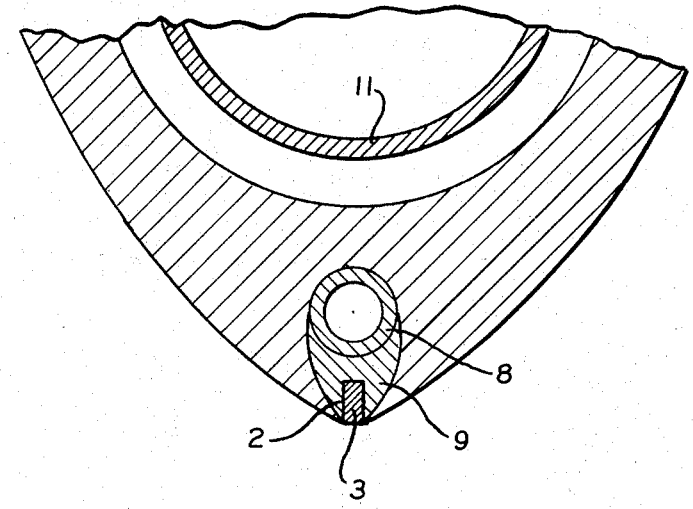
FIG. 3 is a horizontal cross-sectional view taken along line 3—3 of FIG. 2.

Within the scope of the invention, the sealing strip carrier consists of a copper-silicon alloy with an iron group metal (metals of group VIIIb of the Periodic System), such as nickel.

Cast-iron compositions may also be used as a material for the sealing strip carrier.

The inlet and outlet passages communicating with the tube means open at the ends of the piston into the associated annular chamber at an angle of 45°–90°, preferably 50°–80°, particularly 60°–70°, and at a radial angle of 5°–45°, preferably 10°–40°, particularly 20°–30°, to the radius of the tube.

It is also desirable to position the annular coolant supply chamber at the piston face which is remote from or opposite the gear of the piston and the annular coolant discharge chamber of the the gear face of the piston.

To facilitate manufacturing, the face of the gear-side annular chamber may be defined by the gear itself and the face of the annular chamber which is remote from the gear may be defined by a suitably shaped cover in the form of a circular ring.

The sealing strip carrier may alternatively be forced cooled by a groove formed in the piston bearing B (FIG. 2) and from which the coolant, preferably oil from the bearing, is pumped under pressure through corresponding passages into the tube portions of the sealing strip carrier. The coolant may be discharged through an adjusted throttle valve laterally of the bearing.

In accordance with the invention, the change of the direction of the centrifugal force during the revolution of the piston is utilized for a highly effective cooling of the piston corners and particularly of the sealing strips because when the centrifugal force is outwardly directed, the coolant consisting preferably of leakage oil from the piston bearing B (FIG. 2) is forced from those compartments of the annular coolant supply chamber positioned adjacent the piston corners into the tubes of the sealing strip carrier whereas when the centrifugal force is inwardly directed the coolant is forced from the tubes into the annular coolant discharge chamber. The coolant disposed in the remaining compartments of the annular coolant supply chamber moves because of the piston movement through the by-pass conduits into the respective opposite compartments of the annular coolant supply chamber and is pumped from the latter, together with the coolant contained in said compartments, by means of a centrifugal disc known per se.

Referring now to the drawing, the triangular piston 1 is a casting of an aluminum piston alloy and has the configuration of the inner envelope of the epitrochoids of the shell of the housing of the rotary-piston, internal-combustion engine. Each corner of the piston is provided with a radial seal required to seal the combustion chamber. The seal includes a sealing strip 3 which is inserted with a slight play in the piston groove 2 which is parallel to the axis of the piston. Each end of the sealing strip 3 fit in notches formed in the sealing inserts 4 in register with the piston groove 2. The piston groove 2 is contiguous with a sealing strip carrier which is preferably made of tough grey cast-iron and extends radially and parallel to the piston axis adjacent to the piston corner. The sealing strip carrier includes a tube 8 which is closed at both ends by discs 7 inserted into the faces 6, 6' of the piston 1. An extension 9 forms the piston groove 2.

The inlet opening of the tube 8 is connected by an inlet passage 10 to a radially inwardly opening annular chamber 12, which is provided at face 6 of the piston hub 11 which is opposite the gear 17. The discharge opening of tube 8 is connected by a discharge passage 13 to the radially inwardly opening annular chamber 14, which is provided at face 6' of the piston hub 11 which is adjacent the gear 17. The annular chambers 12, 14 are divided into a plurality of crescent-shaped compartments 15. Except for the chambers adjacent the piston corners, the chambers 15 of the annular chamber 12 are connected to the directly opposite chambers 15 of the annular chamber 14 by a by-pass conduit 16 which extends at an angle of 3° from the annular chamber 12 to the annular chamber 14. The end of the annular chamber 14 is defined by the gear 17.

What is claimed is:

1. A rotary engine piston having a plurality of corners comprising:
   a. sealing strip means inserted at each corner of the piston in piston grooves parallel to the piston axis,
   b. sealing strip carrier means made of a material other than that of the piston positioned at each corner of the piston, said carrier means comprising,
      i. tube means closed at both ends and
      ii. extension means forming the piston groove,
   c. two annular chamber means in said piston, said tube means being in communication with said chamber means for circulating a cooling fluid therethrough, said annular chamber means being divided into,
      i. a plurality of compartment means which are in communication with each other within each chamber means,
      ii. the compartment means of one of said chamber means being in communication with the corresponding compartment means of the other of said chamber means except for those compartment means adjacent the corners of said piston.

2. Piston of claim 1, wherein leakage oil from the piston bearing is used as the coolant.

3. A rotary engine piston having a plurality of corners comprising:
   a. sealing strip means inserted at each corner of the piston with a small play in a piston groove parallel to the piston axis, sealing insert means at each face of the piston, the ends of the sealing strip means fitting into notches formed in said sealing insert means in register with the piston groove,
   b. sealing strip carrier means positioned at each corner of the piston and extending radially and parallel to the piston axis, said carrier means being made of a material other than that of the piston and comprising
      i. tube means closed at both ends and
      ii. extension means on the radially outer side of the tube means forming the piston groove,
   c. said tube means communicating through inlet passage means with annular chamber means positioned at one face of the piston, said chamber means being divided into a plurality of compartment means in communication with each other,
   d. said tube means communicating through outlet passage means with annular chamber means positioned at the other face of the piston, said last-mentioned
   e. the compartment means of one annular chamber means between the compartment means at the piston corners being connected by by-pass conduit means to the opposite compartment means of the other annular chamber means.

4. Piston of claim 3, wherein said sealing strip carrier means is made of a copper-silicon alloy with an iron group metal, such as nickel.

5. Piston of claim 3, wherein the sealing strip carrier means is made of a cast-iron.

6. Piston of claim 3, wherein the inlet and outlet passage means of the tube means open into the respective annular chamber means at an angle of 45°–90° relative to the radius of the tube means.

7. Piston of claim 3, wherein the by-pass conduit means are inclined from the first chamber means (12) to the second chamber means (14) at an angle of 0°–30° toward the piston axis.

8. Piston of claim 3, wherein the first chamber means (12) is positioned at that face of the piston which is opposite the gear of the piston and the second chamber means (14) is positioned at that face of the piston which is adjacent to the gear of the piston.

9. Piston of claim 8 wherein the end of the first chamber means (12) is defined by cover means in the form of a circular ring and the end of the second chamber means (14) is defined by the gear of the piston.

* * * * *

UNITED STATES PATENT OFFICE
CERTIFICATE OF CORRECTION

Patent No. 3,799,709 Dated March 26, 1974

Inventor(s) Johannes Reitz, et al

It is certified that error appears in the above-identified patent and that said Letters Patent are hereby corrected as shown below:

IN THE CLAIMS:

Claim 3(d) after "...piston, said last-mentioned" insert --chamber means also being divided into a plurality of compartment means,--.

Signed and sealed this 17th day of September 1974.

(SEAL)
Attest:

McCOY M. GIBSON JR. C. MARSHALL DANN
Attesting Officer Commissioner of Patents